United States Patent
Oh

(10) Patent No.: US 7,664,971 B2
(45) Date of Patent: Feb. 16, 2010

(54) CONTROLLING POWER SUPPLY IN A MULTI-CORE PROCESSOR

(75) Inventor: Jang Geun Oh, Suwon (KR)

(73) Assignee: LG Electronics Inc., Seoul (KR)

( * ) Notice: Subject to any disclaimer, the term of this patent is extended or adjusted under 35 U.S.C. 154(b) by 391 days.

(21) Appl. No.: 11/422,516

(22) Filed: Jun. 6, 2006

(65) Prior Publication Data

US 2006/0282692 A1    Dec. 14, 2006

(30) Foreign Application Priority Data

Jun. 10, 2005    (KR) ............... 10-2005-0049957

(51) Int. Cl.
    *G06F 1/26* (2006.01)
(52) U.S. Cl. ...................... 713/300; 713/320
(58) Field of Classification Search ........ 713/300, 713/320
    See application file for complete search history.

(56) References Cited

U.S. PATENT DOCUMENTS

| | | | |
|---|---|---|---|
| 6,711,447 B1 | 3/2004 | Saeed | |
| 6,804,632 B2* | 10/2004 | Orenstien et al. | 702/188 |
| 7,313,706 B2* | 12/2007 | Williams et al. | 713/300 |
| 2003/0110012 A1 | 6/2003 | Orenstien et al. | |
| 2005/0022038 A1 | 1/2005 | Kaushik et al. | |
| 2006/0099734 A1* | 5/2006 | Narendra et al. | 438/107 |

FOREIGN PATENT DOCUMENTS

WO    03/027820    4/2003

OTHER PUBLICATIONS

Advanced Configuration and Power Interface Specification, Revision 2.0, Jul. 27, 2000.*
European Search Report in Application No. 06011371.9-1243, dated Sep. 4, 2009, 7 pages.

* cited by examiner

*Primary Examiner*—Albert Wang
(74) *Attorney, Agent, or Firm*—Fish & Richardson P.C.

(57) ABSTRACT

Power may be controlled for a multi-core processor that includes a processor having a first core and a second core. A first power conversion unit independently supplies a supply voltage to the first core, and a second power conversion unit independently supplies a supply voltage to the second core. The first core can be configured to supply a voltage identification signal for the first power conversion unit, and the second core can be configured to supply a voltage identification signal for the second power conversion unit that is different from the voltage identification signal for the first core.

20 Claims, 4 Drawing Sheets

CONTROLLING POWER SUPPLY IN A MULTI-CORE PROCESSOR

BACKGROUND

This description relates to a power control apparatus and method for controlling a multi-core processor.

With the increased demand for high-speed processors, multi-core processors are being utilized instead of single-core processors. A multi-core processor, which contains multiple cores in a single processor, can share and process a task among the cores, and thereby improve overall processing capability. Since the cores of the multi-core processor can share other common system components, it is possible to manufacture a system with a lower cost and in a smaller size, as compared with the case of using multiple single-core processors.

Since a multi-core processor operates multiple cores, the multi-core processor typically consumes more power than a single-core processor. The increased power consumption reduces the operating time of a battery that supplies power to a portable computer. As the power consumption increases, the amount of heat generated by the system may also increase.

SUMMARY

In one general aspect, a power control apparatus for a multi-core processor includes a processor including a first core and a second core. The power control apparatus includes a first power conversion unit configured for independently supplying a supply voltage to the first core, and a second power conversion unit configured for independently supplying a supply voltage to the second core.

Implementations may include one or more of the following features. For example, the first core may be configured to supply a voltage identification signal for the first power conversion unit, and the second core may be configured to supply a voltage identification signal for the second power conversion unit. The voltage identification signal for the second core may be different from the voltage identification signal for the first core.

The first power conversion unit may be configured for independently supplying the supply voltage to the first core based upon the voltage identification signal from the first core.

The first power conversion unit may include a DC/DC converter connected to the first core and configured to apply a DC supply power to the first core.

The power control apparatus may include a power management unit. The power management unit may be configured to receive information relating to a usage amount of each of the first and the second cores. For example, the power management unit may be configured to receive information relating to the usage amount of each of the first and the second cores based on an occupancy rate of the first core and an occupancy rate of the second core. The power management unit may be operatively connected to an operating system.

The first power conversion unit may be configured to receive a voltage identification signal from the first core and to adjust a supply voltage to the first core to adjust an operating rate of the first core.

The power control apparatus may include frequency control devices for independently adjusting operating frequencies of the first and the second cores according to a usage amount for each of the first core and the second core. At least one of the frequency control devices may include one or more phased lock loops.

In another general aspect, controlling power for a multi-core processor having multiple cores includes receiving an independent voltage identification signal for each core of the multi-core processor, and independently supplying a supply voltage to each core of the multi-core processor based on the voltage identification signal for each core.

Implementations may include one or more of the following features. For example, information about a usage amount of each core may be obtained, wherein the information about each core may include an occupancy rate of the core obtained from an operating system.

A different voltage identification from each core may be received, and the supply voltage may be independently adjusted based on a usage amount of each core. For example, an operating frequency of each core may be independently changed.

The supply voltage for each core may be controlled by increasing the supply voltage to at least one core to increase an operating rate for that core. The supply voltage supplied for at least one core also may be decreased to decrease an operating rate for that core.

In another general aspect, a power control apparatus for a multi-core processor includes a multi-core processor including at least two cores, wherein the processor is configured to operate in two or more modes, with each mode of the two or more modes having different operating rates. The power control apparatus includes at least two power conversion units operatively connected to the at least two cores for independently supplying a supply voltage for each core of the at least two cores. Each core of the at least two cores is configured for generating an independent voltage identification signal corresponding to each operating mode, and for transmitting the independent voltage identification signals to the power conversion units. Each power conversion unit of the at least two power conversion units is configured for independently supplying the supply voltage to a respective core of the at least two cores based on the independent voltage identification signals.

Implementations may include one or more of the following features. For example, the power conversion units may each include a DC/DC converter for applying a DC power supply.

The apparatus may include a power management unit configured for receiving information relating to a usage amount of each of the at least two cores and based on an occupancy rate of each of the at least two cores.

In another general aspect, a computer-readable recording medium includes computer-executable program instructions embodied thereon for controlling power for a multi-core processor. The power is controlled by receiving a voltage identification signal for each core of the multi-core processor, and independently supplying a supply voltage for at least one core of the multi-core processor based on a voltage identification signal for each of the cores.

Other features will be apparent from the following description, including the drawings, and the claims.

DETAILED DESCRIPTION

The term "multi-core processor" refers to a system or apparatus having a data processing capability which also includes two or more processing cores in a single chip. Such a multi-core processor typically refers to the central processing unit of a computer, but may include an additional processor, an input/output processor, or another device encoded or configured for executing process instructions.

Figure 1:
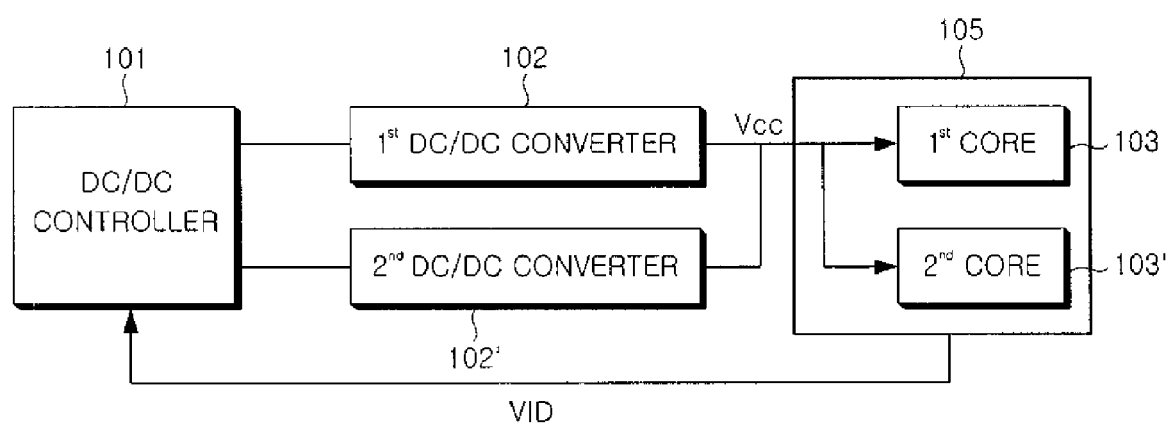
FIGS. 1 and 2 are functional block diagrams of a power control apparatus for a multi-core processor.

Referring to FIG. 1, a processor 105 includes a first core 103, a second core 103', DC/DC converters 102 and 102', and a DC/DC controller 101. The DC/DC converters 102 and 102' convert power received from a battery, or other power source, into a voltage suitable for each of cores 103 and 103'. The DC/DC controller 101 controls the DC/DC converters 102 and 102' in order to adjust the voltage applied to each core 103 or 103'.

Since all the output voltages of the DC/DC converters 102 and 102' are input to the processor through a single route (e.g., without regard to the number of the DC/DC converters), the individual core voltages are not adjusted individually for each core. For instance, if the first core 103 operates at a high operating rate, while the second core 103' is not operated, the same voltage is still applied to the first core 103 and to the second core 103'. Accordingly, a leakage current can occur that can reduce an already limited battery capacity.

In one type of power management technique, various CPU-power management modes are provided in order for the user to select a CPU-power manage management mode suitable for current operating conditions. For example, the supply voltage for a processor and a core frequency may be adjusted dynamically according to each mode, thereby reducing power consumption. Each core has operating rate modes of various levels between a high frequency mode and a low frequency mode. The voltage supplied to each core differs depending on the mode such that a high voltage is supplied to a core in a high-frequency mode and a low voltage is supplied to a core in a low-frequency mode.

However, if this technique is applied to a multi-core processor, only a single voltage identification signal (VID) is used. Although a first core, which was operating in a high-frequency mode, may switch to a low-frequency mode if a second core is in operation, the first core still receives a voltage for the high-frequency mode, which may potentially generate a large leakage current from the first core.

A power control apparatus for a multi-core processor includes power conversion units that estimate the usage amount of each core and individually adjust voltages supplied to each core. Specifically, the power conversion units receive separate voltage identification signals (VIDs) from each core, and provide different supply voltages to each core depending on the received VIDs.

Each core of the processor creates a separate VID depending on the usage amount of each relevant core, and applies each created VID to a power conversion unit, which is connected to each relevant core in order to separately apply a voltage to the relevant core. Since each core individually receives a different supply of power, power consumption is more efficient and effectively reduced.

If a single VID is used to manage all of the cores in a multi-core processor, a first core can be operated in a low-frequency mode while a second core is operated in a high-frequency mode. If the first core receives a supply voltage for the high-frequency mode, a large leakage current occurs from the first core. However, if supply voltages for the cores are individually adjusted depending on each separate VID applied from each core, the first core receives a lower supply voltage suitable for the low-frequency mode in the above-mentioned case, thereby significantly reducing a leakage current of the first core.

Figure 2:
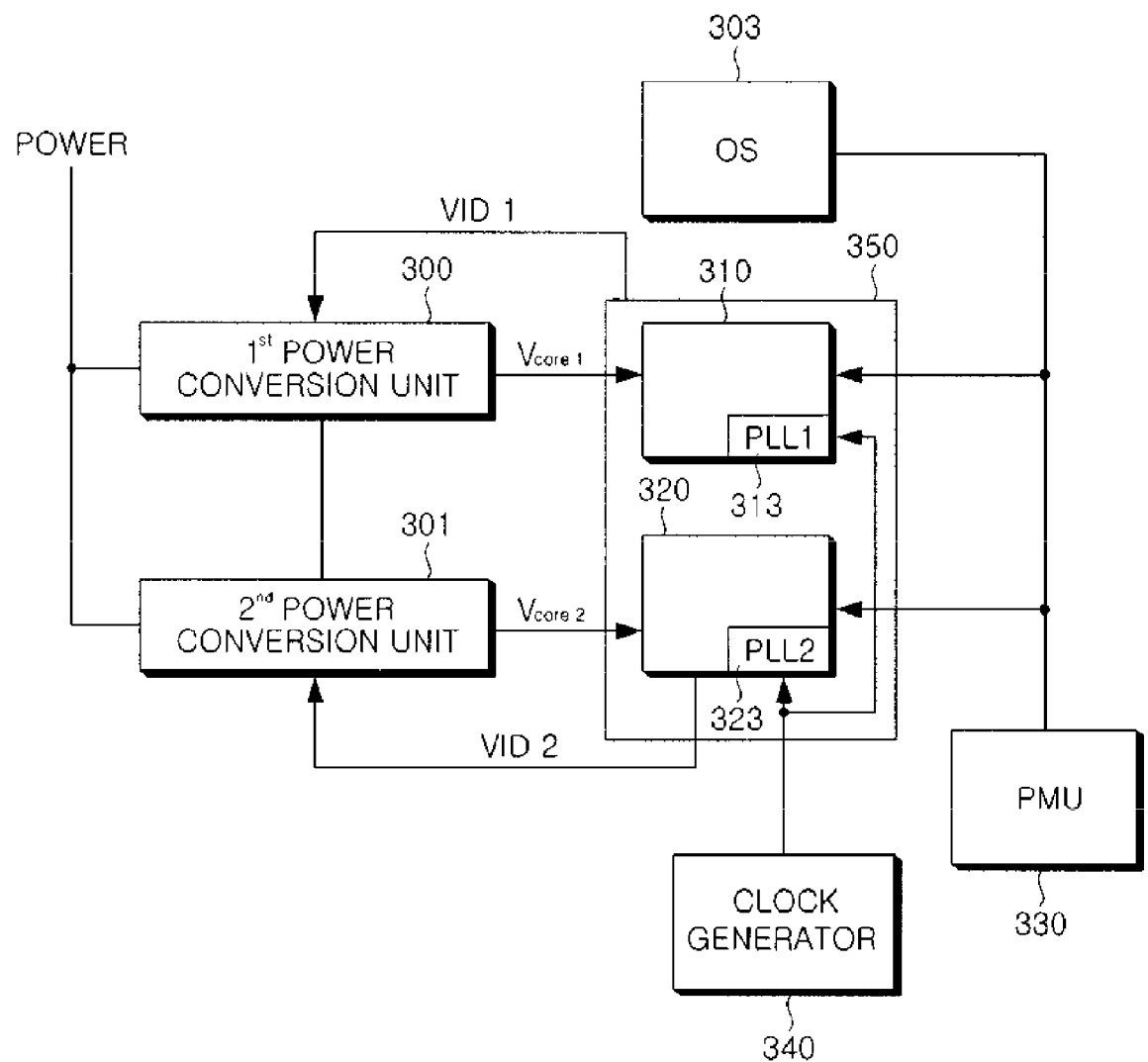

Referring to FIG. 2, an exemplary power control apparatus for the multi-core processor includes a processor 350, a first power conversion unit 300, and a second power conversion unit 301. The processor 350 includes a first core 310 and a second core 320. The first and second power conversion units 300 and 301 are connected to the first and second cores 310 and 320 included in the processor 350, respectively, so as to apply a different supply voltage to each connected core depending on power consumption for each connected core.

If the operating rate of a core should be increased, the first or second power conversion unit 300 or 301 receives a VID from the relevant core, and increases the supply voltage for the relevant core to a higher level according to the received VID. In contrast, if the operating rate of a core should be decreased, the first or second power conversion units 300 and 301 receives a VID from the relevant core, and decreases the supply voltage for the relevant core to a lower level according to the received VID.

The first and second cores 310 and 320 of the processor 350 may operate in various modes depending on their operating rates (e.g., depending on the clock frequency for each core). For example, the operating frequencies of each core may be divided into five steps of 0.8 GHz, 1 GHz, 1.2 GHz, 1.4 GHz, and 1.6 GHz, so as to be adjusted based on the divided steps. Each core receives a separate supply voltage depending on its operating frequency. If the operating frequency of a core changes, the supply voltage for the core also changes. For example, the operating frequencies may correspond to supply voltages as follows: 1.0V for 0.8 GHz, 1.05V for 1 GHz, 1.1V for 1.2 GHz, 1.15V for 1.4 GHz, and 1.2V for 1.6 GHz. Therefore, the VID represents a signal for identifying the supply voltage for each mode of a core, which operates in various modes as described above.

When power is supplied from a power source, such as a battery or external AC power source, the first and second power conversion units 300 and 301 individually supply a suitable operating voltage to the first and second cores 310 and 320, respectively. An operating system 303 of a system including the multi-core processor checks the usage amount of each core 310 or 320, and then transfers a result of the check to a power management unit (PMU) 330. The PMU 330 controls each core included in the processor, and may generally be included in a south bridge or north bridge of a computer system.

The first and second cores 310 and 320 create VID1 and VID2, respectively, which designate each relevant voltage to be generated under the control of the PMU 330. The cores 310 and 320 provide the VID1 and VID2 for the first and second power conversion units 300 and 301, respectively, to the first and second power conversion units 300 and 301, which, in turn, supply the required supply voltages for each core. Accordingly, the first and second power conversion units 300 and 301 can individually adjust the supply voltages for each core according to the VIDs received from the cores.

The usage amount of each core may be determined based on the thread or the occupancy percentage of each core, or may be based on other approaches. The usage amount of each core may be determined by using an approach similar to that described in Korean Patent Application Serial No. 2000-0050037, which is titled a "Method of Checking the Usage Amount of CPU" and has been filed in the Korean Intellectual Property Office, the entirety of which is hereby incorporated by reference. Also, the usage amount of each core may be easily determined by using a method of checking the usage amount of a CPU, which is used in "Windows XP®" of the Microsoft Corporation®.

The first and second power conversion units 300 and 301 may be included in a DC/DC converter or may be constructed as a form of power regulator, in which case the DC/DC converter applies a DC supply power to each core. The first core 310 receives a supply voltage "$V_{core1}$" from the first power conversion unit 300, and the second core 320 receives a supply voltage "$V_{core2}$" from the second power conversion unit 301.

The first and second cores 310 and 320 each include a respective phase locked loop, designated as PLL1 313 or PLL2 323. Each of the PLL1 313 and PLL2 323 receives an external clock frequency, e.g. 100 MHz or 133 MHz, adjusts the frequency of the clock signal to a high frequency, a middle frequency, or a low frequency depending on the usage amount of a corresponding core, and then provides the adjusted frequency to a logic unit included in the corresponding core. A clock generator 340 provides a clock signal to both the PLL1 313 of the first core 310 and the PLL2 323 of the second core 320.

The first and second power conversion units 300 and 301 of the power control apparatus may be implemented with a hardware block, a software block, or a firmware block. In addition, the first and second power conversion units 300 and 301 may include a voltage regulator controller, such as a controller employing an Intel mobile voltage positioning (IMVP) technique developed by the Intel Corporation®.

A power control operation of a multi-core processor having the aforementioned construction will now be described in greater detail. The PMU 330 receives information about the usage amounts of the first and second cores 310 and 320 from the operating system 303, and controls the first and second cores 310 and 320. The first core 310 generates signal "VID1" corresponding to the usage amount of the first core 310 under the control of the PMU 330, and transmits the generated signal VID1 to the first power conversion unit 300. Similarly, the second core 320 generates signal "VID2" corresponding to the usage amount of the second core 320 under the control of the PMU 330, and transmits the generated signal VID2 to the second power conversion unit 301. The PMU 330 may also be included in an operating system, such as Windows XP® by the Microsoft Corporation®.

The first power conversion unit 300 converts power input from a power source into a voltage suitable for the first core 310. The first power conversion unit 300 generates a supply voltage suitable for the first core 310 depending on the signal VID1 received from the first core 310, and provides the generated supply voltage to the first core 310. Similarly, the second power conversion unit 301 generates a supply voltage suitable for the second core 320 depending on the signal VID2 received from the second core 320, and provides the generated supply voltage to the second core 320. For example, when the usage amount of the first core 310 is equal to or greater than 95%, the first core 310 operates at a maximum operating rate mode. In addition, the following exemplary correlations between voltage and operating rate are provided based on the assumption that the operating frequencies of a core are divided and adjusted based on five steps as follows: 1.0V for 0.8 GHz, 1.05V for 1 GHz, 1.1V for 1.2 GHz, 1.15V for 1.4 GHz, and 1.2V for 1.6 GHz. Each core receives a different supply voltage depending on its operating frequency. In the maximum operating rate mode, the first core 310 generates a corresponding VID and converts its operating frequency into a corresponding frequency (1.6 GHz) in order to operate at 1.6 GHz (1.2V). If the usage amount of the first core 310 is equal to or less than 75%, the first core 310 may be shifted into the next operating rate mode of 1.4 GHz (1.15V), or may be shifted into a minimum operating rate mode of 0.8 GHz (1.0V) in some cases. However, the incremental voltages and operating frequencies of the cores, which have been set based on the usage amounts of the first and second cores 310 and 320, may be changed to various intervals and with a number of operating ranges.

If the first core 310 operates in a low-frequency mode, the supply voltage for the first core 310 is adjusted so as to have as low a value as possible, and the clock frequency of the first core 310 is also adjusted so as to have a low value. Accordingly, the first core 310 generates a VID corresponding to the low frequency mode, and transmits the generated VID to the first power conversion unit 300. The first power conversion unit 300 generates a supply voltage, which is one-step lower than the current supply voltage for the first core 310, and the generated supply voltage Vcore1 is provided to the first core 310.

In contrast, if the first core 310 operates in a high-frequency mode in view of the usage amount thereof, the supply voltage for the first core 310 is maintained at as high a value as possible, and the clock frequency of the first core 310 is also maintained at a high value. Accordingly, the first core 310 generates a VID corresponding to a high frequency mode, and transmits the generated VID to the first power conversion unit 300. The first power conversion unit 300 generates a supply voltage, which is one step higher than the current supply voltage for the first core 310, and the generated supply voltage Vcore1 is provided to the first core 310.

After the adjustment of the supply voltage, it is determined whether the supply voltage for the first core has been adjusted to a target level. If the supply voltage for the first core does not reach the target level, the supply voltage may be additionally adjusted at intervals until the supply voltage reaches the target level.

A voltage control apparatus for a multi-core processor includes a processor containing two or more cores and a plurality of power conversion units. The power conversion units are connected to the cores included in the processor, so as to adjust the supply voltage for each core. Each core included in the processor operates in various modes having different operating rates, generates a VID based on a usage amount of the core, and independently transmits the VID to the power conversion units. Each power conversion unit independently receives a VID from a corresponding core included in the processor, and independently adjusts the supply voltage for the corresponding core based on the received VID.

If a core operates at a higher operating rate than the current operating rate, a relevant VID is transmitted from the core to a corresponding power conversion unit connected to the core. The corresponding power conversion unit adjusts the supply voltage for the core, so as to increase the operating frequency of the core by one step. If the adjustment of the supply voltage is complete, it is determined whether the supply voltage for the core has been adjusted to a target level. If the supply voltage for the core has not reached the target value, the supply voltage for the core may be readjusted while increasing the supply voltage at intervals until the supply voltage reaches the target level. Accordingly, a separate VID is generated to control each core of a multi-core processor, and unnecessary power waste can be minimized.

The power control apparatus may further include frequency control units that independently adjust the frequencies of the cores depending on the usage amount of each core. Accordingly, the frequency and supply voltage of each core can be linked and adjusted based on the usage amount of the core.

Figure 3:
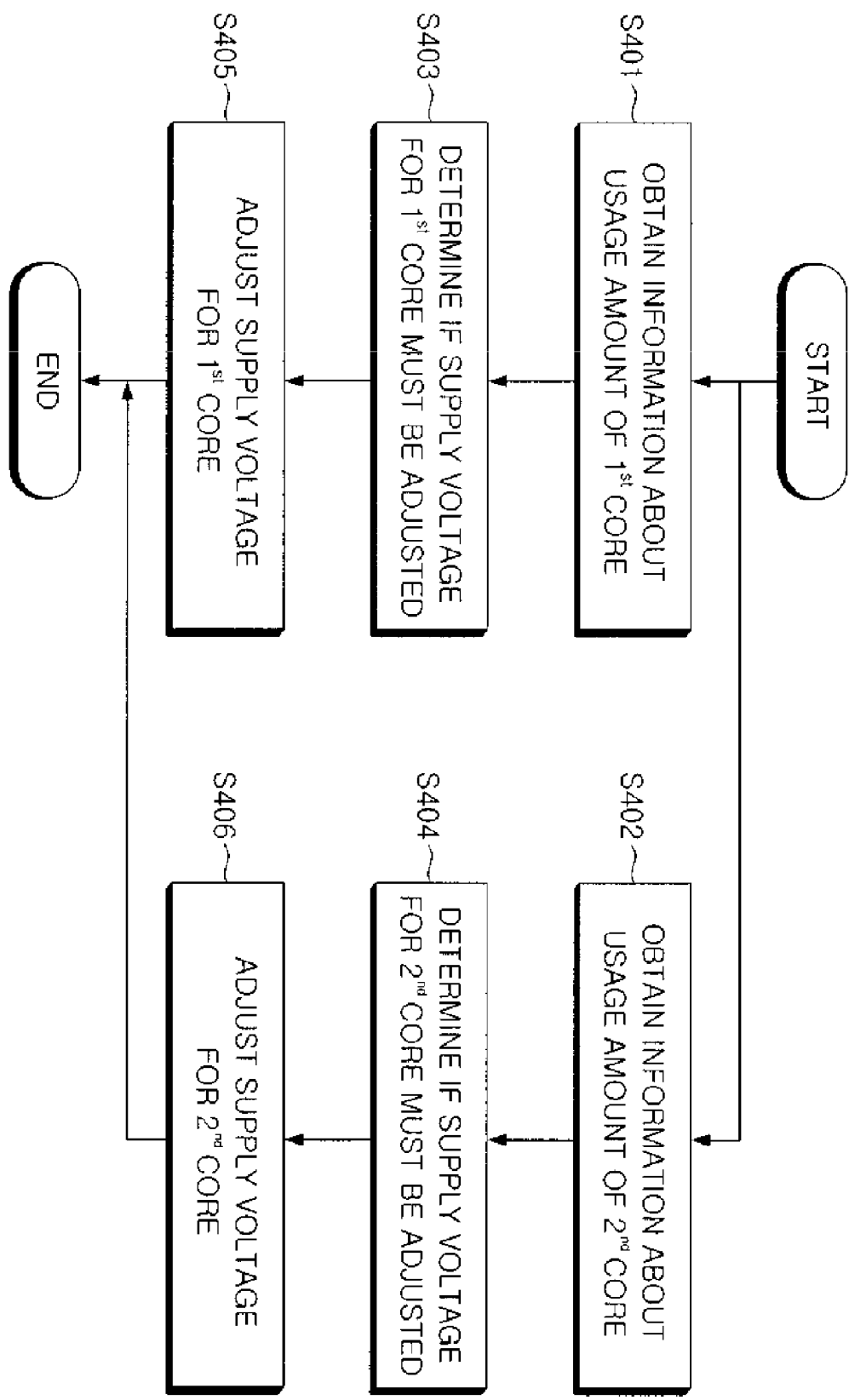
FIGS. 3 and 4 are flowcharts of power control processes for a multi-core processor.

Referring to FIG. 3, a control process for the power of the multi-core processor includes obtaining information about the usage amounts of the cores (S401 and S402). Next, a determination is made as to whether it is necessary to adjust the supply voltage for a core based on the information obtained about the usage amounts of the cores (S403 and S404). The supply voltage for at least one core then may be independently adjusted, if necessary, based on the usage amount of each corresponding core (S405 and S406). The supply voltage for each core can be adjusted individually, and the operating frequency of each core can be simultaneously controlled based on the usage amount of each core.

In an exemplary multi-core processor, e.g., a dual-core processor having two cores, the supply voltages for first and second cores are adjusted separately. The frequencies of the first and second cores are also separately adjusted based on the usage amount of each core, e.g., both the VID and the operating frequency of a core may be changed at the same time.

Figure 4:
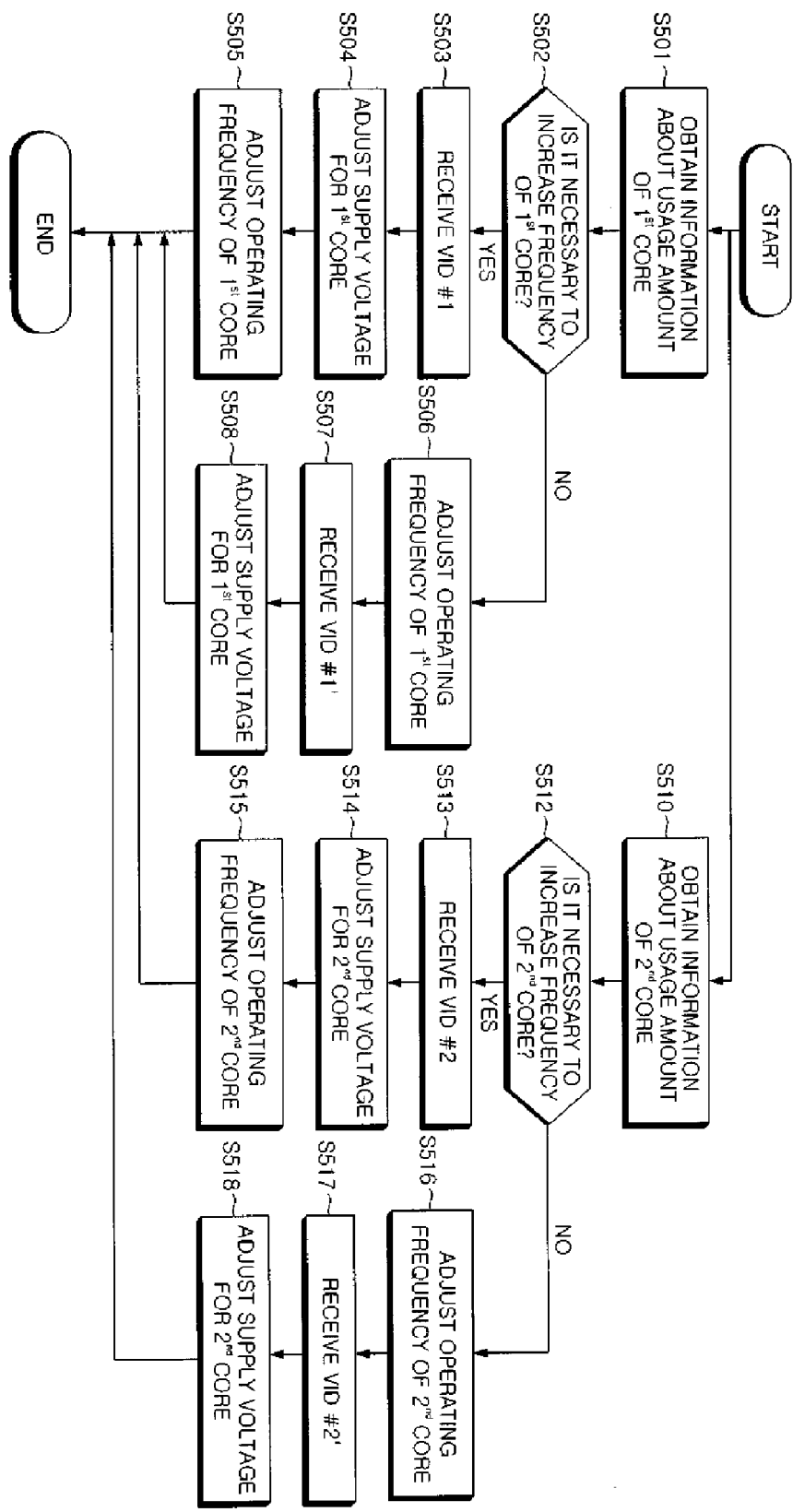

Referring to FIG. 4, information about the usage amount of the first core is obtained from the operating system (S501). In this case, the usage amount of each core may be determined based on the thread or the occupancy percentage of each core. After the information about the usage amount of the first core has been obtained, it is determined if it is necessary to adjust the supply voltage for the first core (S502). If it is determined that the operating frequency of the first core must be increased to a level higher than the present level of the first core, e.g., due to a relatively large workload on the first core, a new VID (VID #1) is received from the first core (S503). The new VID #1 results in a change in the supply voltage for the core followed by an adjustment of the frequency of the core. The supply voltage for the first core is first adjusted based on the received VID #1 (S504), and the operating frequency of the first core is adjusted (S505).

If it is determined that the operating frequency of the first core should be reduced to a level lower than the present level of the first core, e.g., based on a relatively light workload for the first core, the frequency of the first core is decreased and the supply voltage for the first core is subsequently reduced. In this case, the operating frequency of the first core is adjusted (S506), and a new VID (VID #1') is received from the first core (S507). The supply voltage for the first core is subsequently adjusted based on the received VID #1' (S508).

The adjustment procedure for the supply voltage of the second core is performed independently from the adjustment procedure for the supply voltage of the first core (S510). After information about the usage amount of the second core is obtained, it is determined if it is necessary to adjust the supply power for the second core. It then is determined if it is necessary to increase the operating frequency of the second core to a level higher than that of the present operating frequency (S512).

If it is determined that the operating frequency of the second core must be increased to a level higher than the present level of the second core, e.g., based on a large usage amount or workload of the second core, a new VID (VID #2) is received from the second core (S513). The supply voltage for the second core then is adjusted based on the received VID #2 (S514), and the operating frequency of the second core is adjusted (S 515).

If it is determined that the operating frequency of the second core must be decreased to a level lower than the present level of the second core, e.g., based on relatively small usage amount of the second core, the frequency of the second core is adjusted, and the supply voltage for the second core is subsequently adjusted. The operating frequency of the second core is adjusted (S516), and a new VID (VID #2') is received from the second core (S517). Next, the supply voltage for the second core is adjusted based on the received VID #2' (S518).

One or more of the aforementioned processes can be stored as computer-readable codes within a computer-readable, recording medium. The computer-readable recording medium can include any number of recording media in which the computer-readable data can be stored. For example, the computer-readable recording medium may include one or more of a ROM, an EEPROM, a flash EEPROM, a floppy disk, a CD-ROM, or any optical data recording medium.

For example, the computer-readable recording medium can include computer-executable program codes for performing a power control process for a multi-core processor, including obtaining information about the usage amount of the first core, receiving a first VID corresponding to the usage amount of the first core from the first core, and adjusting the supply voltage for the first core based on the first VID received from the first core. The power control process can also include obtaining information about the usage amount of the second core, receiving from the second core a second VID corresponding to the usage amount of the second core, and adjusting the supply voltage for the second core based on the second VID received from the second core.

A program for executing a power control process may be similarly stored during a semiconductor fabrication process. If a program is separately stored in a storage medium, or is downloaded through a wired or wireless network, the program may be set up either in such a manner that an existing program is deleted and the program is newly set up, or in a scheme of updating an existing program, e.g., such as a program patch.

The aforementioned power control apparatus and/or method for a multi-core processor intelligently distributes power to each core of the multi-core processor based on the usage amount of the relevant cores. Accordingly, the load on the cores can be effectively managed, and power consumption can be minimized. In addition, battery power can be used more efficiently, unnecessary leakage currents can be prevented, and/or the performance of the processor can be optimized.

Since power consumption of the processor is directly related to the operating time period of a battery, the amount of space occupied by the battery can be reduced and the unnecessary generation of heat can be reduced. A portable computer can also be manufactured to have a more compact size and a slimmer thickness.

A method for providing a voltage to each core in a multi-core processor may be realized by software only, so that the method can be implemented at a low cost.

It will be apparent that various modifications and variations can be made. For example, the power control apparatus and/or method for the multi-core processor can be applied to a number of mobile devices, including a notebook computer, a smart phone, a portable phone, a PDA, a desktop computer, and/or a network server. Although an exemplary dual-core processor having two cores has been described above, control of power to a multi-core processor can include a multi-core processor having three or more cores.

Other implementations are within the scope of the following claims.

What is claimed is:

1. A power control apparatus for a multi-core processor, comprising:
 a processor including a first core and a second core;
 a first power conversion unit configured to independently supply a first supply voltage to the first core;

a second power conversion unit configured to independently supply a second supply voltage to the second core; and a power management unit configured to receive information relating to a usage amount of each of the first and the second cores, the first supply voltage being controlled based on the information relating to the usage amount of the first core and being controlled independent of the information relating to the usage amount of the second core, and the second supply voltage being controlled based on the information relating to the usage amount of the second core and being controlled independent of the information relating to the usage amount of the first core, wherein the power management unit is operatively connected to an operating system.

2. The power control apparatus of claim 1, wherein the first core is configured for supplying a voltage identification signal for the first power conversion unit, and the second core is configured for supplying a voltage identification signal for the second power conversion unit, wherein the voltage identification signal for the second core is different from the voltage identification signal for the first core.

3. The power control apparatus of claim 2, wherein the first power conversion unit is configured for independently supplying the first supply voltage to the first core based upon the voltage identification signal from the first core.

4. The power control apparatus of claim 1, wherein the first power conversion unit comprises a DC/DC converter connected to the first core and configured for applying a DC supply power to the first core.

5. The power control apparatus of claim 1, wherein the first power conversion unit is configured for receiving a voltage identification signal from the first core and for adjusting a supply voltage to the first core to adjust an operating rate of the first core.

6. The power control apparatus of claim 1, further comprising a plurality of frequency control devices for independently adjusting operating frequencies of the first and the second cores according to a usage amount for each of the first core and the second core.

7. The power control apparatus of claim 6, wherein at least one of the frequency control devices comprises one or more phase locked loops.

8. The power control apparatus of claim 1, wherein the first and second supply voltages are controlled based on a comparison of the information relating to the usage amount of the first and second cores to at least one threshold usage amount.

9. A power control method for a multi-core processor having multiple cores, the method comprising:

obtaining information about a usage amount of each core;

receiving an independent voltage identification signal for each core of the multi-core processor, each voltage identification signal being based on the information about the usage amount of a corresponding core and independent of the information about the usage amount of any other core; and independently supplying a supply voltage to each core of the multi-core processor based on the voltage identification signal for each core.

10. The method of claim 9, further comprising:

receiving a different voltage identification from each core; and independently adjusting the supply voltage for each core based on a usage amount of each core.

11. The method of claim 9, wherein supplying the supply voltage to each core is based on a usage amount of each core.

12. The method of claim 9, further comprising independently changing an operating frequency of each core.

13. The method of claim 9, wherein supplying the supply voltage to each core comprises increasing the supply voltage to at least one core to increase an operating rate for the at least one core.

14. The method of claim 9, wherein supplying the supply voltage to each core comprises decreasing the supply voltage to at least one core to decrease an operating rate for the at least one core.

15. The method of claim 9, wherein each voltage identification signal is based on a comparison of the usage amount of the corresponding core to at least one threshold usage amount.

16. A power control apparatus for a multi-core processor, comprising:

a multi-core processor including at least two cores, wherein the processor is configured to operate in two or more modes, each mode of the two or more modes having different operating rates;

at least two power conversion units, each power conversion unit being operatively connected to one of the at least two cores for independently supplying a supply voltage to the connected core; and a power management unit configured to receive information relating to a usage amount of each of the at least two cores, and configured to control the supply voltage for each core based on the information relating to the usage amount of the cores respectively and being controlled independent of the information relating to the usage amount of another core, wherein the power management unit is operatively connected to an operating system;

wherein each core of the at least two cores is configured for generating an independent voltage identification signal corresponding to each operating mode, and for transmitting the independent voltage identification signals to the power conversion units, and wherein each power conversion unit of the at least two power conversion units is configured for independently supplying the supply voltage to a respective core of the at least two cores based on the independent voltage identification signals.

17. The power control apparatus of claim 16, wherein the power conversion units each comprise a DC/DC converter for applying DC supply power.

18. The power control apparatus of claim 16, wherein the supply voltage for each core is controlled based on a comparison of the information relating to the usage amount of the cores to at least one threshold usage amount.

19. A computer-readable recording medium having computer-executable program instructions embodied thereon for performing a power control method for a multi-core processor, the method comprising:

obtaining information about a usage amount of each core, wherein the information about a usage amount of each core includes information obtained from an operating system;

receiving a voltage identification signal for each core of the multi-core processor each voltage identification signal being based on the information about the usage amount of a corresponding core independent of the information about the usage amount of another core; and independently supplying a supply voltage to the corresponding core of the multi-core processor based on the voltage identification signal for each of the cores.

20. The computer-readable recording medium claim 19, wherein each voltage identification signal is based on a comparison of the information about the usage amount of each core to at least one threshold usage amount.

* * * * *

UNITED STATES PATENT AND TRADEMARK OFFICE
CERTIFICATE OF CORRECTION

PATENT NO.       : 7,664,971 B2                                      Page 1 of 1
APPLICATION NO.  : 11/422516
DATED            : February 16, 2010
INVENTOR(S)      : Jang Geun Oh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Fourth Day of January, 2011

David J. Kappos
*Director of the United States Patent and Trademark Office*